United States Patent
Cirincione et al.

[19]

[11] Patent Number: 5,917,106
[45] Date of Patent: Jun. 29, 1999

[54] METHOD AND APPARATUS FOR INTRODUCING GLASS GOBS INTO A GLASS CONTAINER FORMING MACHINE

[75] Inventors: Ronald A. Cirincione, Sylvania, Ohio; J. Michael Worley, Lakeland, Fla.; Robert S. Wacke, Toledo, Ohio; Thomas E. Jablonowski, Perrysburg, Ohio; Arnold R. Miller, Sylvania, Ohio; Robert J. Greenawalt, Perrysburg, Ohio

[73] Assignee: Owens-Brockway Glass Container Inc., Toledo, Ohio

[21] Appl. No.: 08/949,186

[22] Filed: Oct. 14, 1997

[51] Int. Cl.$^6$ ........................................ C03B 7/14
[52] U.S. Cl. ................... 65/122; 65/72; 65/75; 65/126; 65/127; 65/207; 65/225; 65/303; 65/304; 65/323
[58] Field of Search ................... 65/72, 75, 122, 65/126, 127, 207, 225, 303, 304, 323

[56] References Cited

U.S. PATENT DOCUMENTS

| | | | |
|---|---|---|---|
| 1,531,559 | 3/1925 | Lynch | 65/304 |
| 1,531,561 | 3/1925 | Lynch | 65/304 |
| 2,020,623 | 11/1935 | Stenhouse | 65/122 |
| 2,116,284 | 5/1938 | Ross | 65/304 |
| 2,209,018 | 7/1940 | Peiler | 65/304 |
| 3,198,617 | 8/1965 | Denman et al. | 65/304 |
| 3,672,860 | 6/1972 | Keller . | |
| 3,721,544 | 3/1973 | Bystrianyk et al. | 65/304 |
| 3,770,409 | 11/1973 | Colchagoff . | |
| 4,120,683 | 10/1978 | Irwin . | |
| 4,339,263 | 7/1982 | Martin . | |
| 4,466,821 | 8/1984 | Irwin et al. . | |
| 4,718,933 | 1/1988 | Suomala et al. . | |
| 4,936,893 | 6/1990 | Yamada et al. | 65/374 |
| 5,394,910 | 3/1995 | Sweetland | 65/304 |
| 5,511,593 | 4/1996 | Sweetland . | |

*Primary Examiner*—Peter Chin
*Assistant Examiner*—Michael P. Colaianni

[57] ABSTRACT

A gob of molten glass from a gob delivery system is introduced into a blank mold of a glass container forming machine of the individual section type by way loading funnel immediately upstream of an opening into the blank mold. The loading funnel has an upper annular gathering portion in the shape of an inverted frustum of a cone and a cylindrical lower shaping and orienting section. The internal diameter of the shaping and orienting section is somewhat less than the outer diameter of a gob passing therethrough, to thereby contact the gob in a substantially circumferential pattern, and the shaping and orienting section has a length that is sufficient to precisely align the longitudinal central axis of the gob with a longitudinal central axis of the blank mold, to thereby eliminate or substantially eliminate the need to swab the interior of the blank mold with a mold dopant composition.

3 Claims, 2 Drawing Sheets

5,917,106

METHOD AND APPARATUS FOR INTRODUCING GLASS GOBS INTO A GLASS CONTAINER FORMING MACHINE

FIELD OF THE INVENTION

This invention relates to a method of, and apparatus for, introducing gobs of molten glass into a mold of a glass container forming machine of the individual section ("I.S.") type. More particularly, this invention relates to a method and apparatus of the foregoing character in which a glass gob is introduced into a blank mold of a glass container forming machine of the foregoing type with the central axis of the gob precisely aligned with the central axis of the blank mold.

BACKGROUND OF THE INVENTION

Hollow glass articles, such as bottles and jars, when molded by a forming machine of the I.S. type, are molded in two steps. In the first step, a preform of the finished container, namely an article with a closed end and an open end, which is usually called a blank or a parison, is molded by an annular mold that is made up of a pair of mating blank mold sections. Upon a completion of the blank molding step, the blank mold sections separate, and the blank or parison is transferred to another mold station, often called the blow mold station, where it is blown annular mold that is made up of another mating pair of mold sections. At the conclusion of the blow mold process, the mating sections of the blow mold are separated, and the container is removed from the forming machine for further processing.

Parisons are formed in the blank mold of an I.S. machine, either by blowing or pressing, in an inverted orientation, that is, with its open end down, and the gob from which the parison is to be formed is introduced into the blank mold through an opening at the top of the blank mold. After the gob is in place, the opening at the top of the blank mold is closed by a baffle; which is moveable into and out of alignment with the opening at the top of the blank mold. The blank molding operation occurs while the baffle is in its closing position with respect to the blank mold. The use of a set of four baffles to close the blank molds of an I.S. machine in which four containers are simultaneously formed at each I.S. machine section ("a quad" machine) is disclosed in U.S. Pat. No. 4,466,821 (Irwin et al.). which is assigned to the assignee of this application, the disclosure of which is incorporated herein by reference.

It is also known to provide a funnel that is indexed into and out of alignment with an opening into a blank mold for the gob to pass through immediately before it enters the blank mold. U.S. Pat. No. 3,672.860 (Keller), the disclosure of which is also incorporated by reference herein, discloses such a funnel for the purpose of imparting a non-round shape to the gob, which otherwise would inherently be round, as a step in the forming of non-round containers, such as flasks, from such gobs. As is clear from the '860 reference, the axial length of the funnel disclosed therein is substantially shorter than the axial length of the gobs passing therethrough. Thus, it is possible for gobs entering blank molds of a forming machine according to the teachings of the '860 patent to have their longitudinal central axes out of alignment with the longitudinal central axis of the blank mold. Because of this, it is known to periodically swab the interior of a blank mold with a mold dope composition to provide suitable lubrication between the gob and the mold for proper orientation therebetween during the forming of a parison from a gob. The use of such a mold doping technique is labor intensive, and it is messy and otherwise objectionable, and it is highly desirable to eliminate, or at least substantially reduce, the need for such mold doping.

BRIEF DESCRIPTION OF THE INVENTION

According to the present invention there is provided an improved method and apparatus for introducing glass gobs sequentially into a blank mold of a glass forming machine of the I.S. type. The apparatus is an improved loading funnel that is moved into position immediately upstream of an opening into the blank mold when it is time to introduce a gob of molten glass into the blank mold. The molding funnel of the present invention has an axial length at least sufficiently long to accurately align the longitudinal central axis of the gob passing therethrough with respect to the longitudinal central axis of the blank mold. For example, the axial length of the loading funnel is at least slightly longer than the axial length of the gobs to be passed therethrough. The loading funnel of the present invention has an upper portion in the shape of an inverted conical frustum, to serve as a gob gathering region, and a lower, cylindrical portion with an internal passage, which may be circular in cross sectional configuration, that is at least slightly smaller than the outside diameter of the gobs to be passed therethrough, and also slightly smaller than the smallest passage into the blank mold, to ensure that the gobs entering the blank mold are properly shaped and sized to conform to an ideal for the internal size and shape of the cavity in the blank mold into which the gob is to be introduced.

Accordingly, it is an object of the present invention to provide an improved method and apparatus for introducing a gob of molten glass into a blank mold of a glass forming machine of the I.S. type. More particularly, it is a an object of the present invention to provide a method and apparatus of the foregoing character for introducing a gob of molten glass into a blank mold with a longitudinal central axis of the gob so precisely aligned with a longitudinal central axis of the mold, and with the outside extent of the gob so shaped and sized with respect to the internal size and shape of a cavity, as to be able to eliminate or substantially eliminate the need for periodically swabbing the interior of the blank mold cavity with a liquid dopant to ensure proper operation on the blank mold.

For a further understanding of the present invention and the objects thereof. attention is directed to the drawing and the following brief description thereof, to the detailed description of the preferred embodiment and to the appended claims.

IN THE DRAWING

FIG. 1 is an elevational view, partly in cross-section, of a loading funnel in accordance with a preferred embodiment of the present invention shown in combination with a blank mold of a glass forming machine of the I.S. type and the deflector of a glass gob delivery system or delivering gobs of molten glass to the blank mold; and FIG. 2 is a sectional view taken on line 2—2 of FIG. 1.

DETAILED DESCRIPTION OF THE PREFERRED EMBODIMENT

Figure 2:
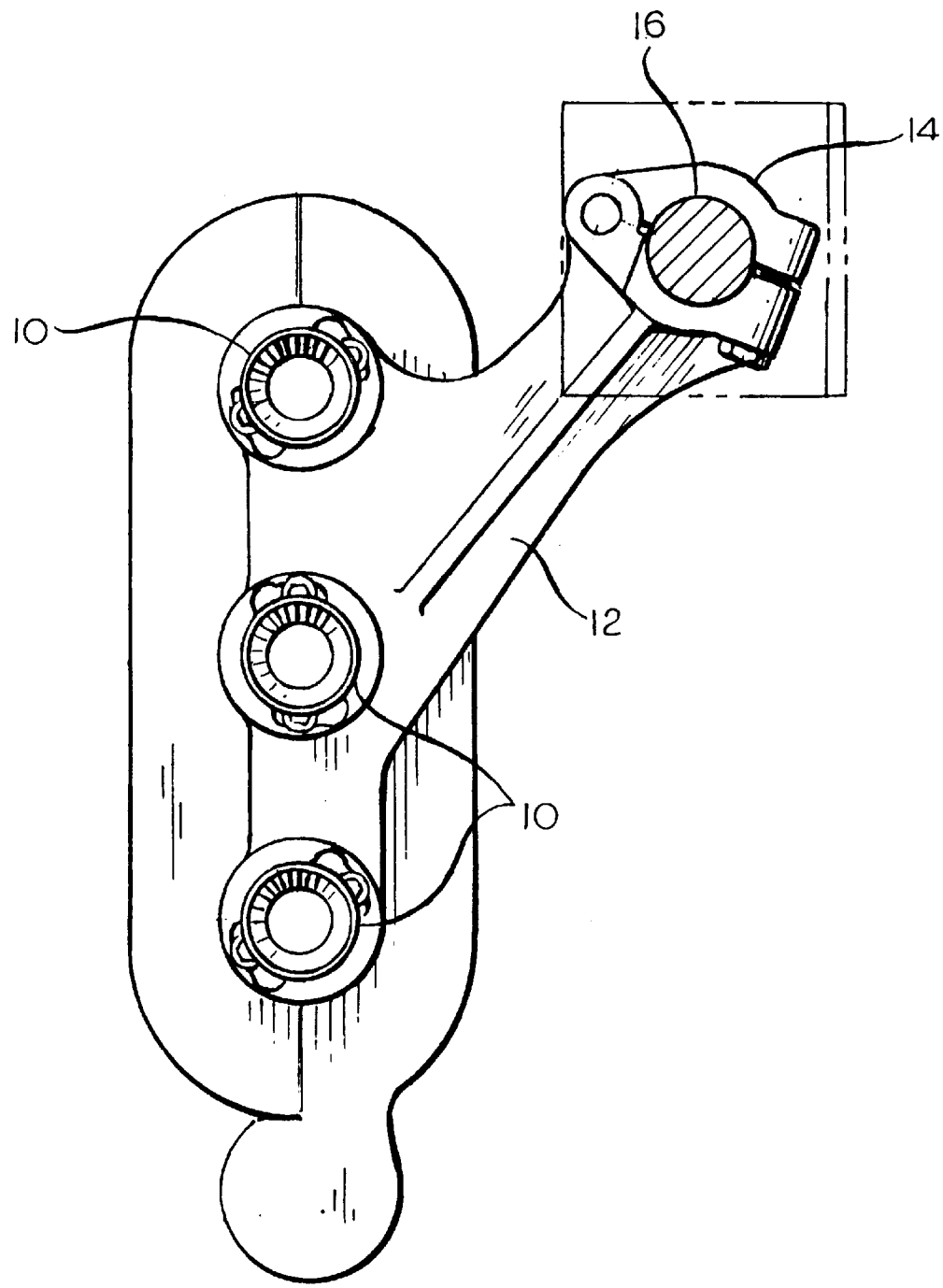

A loading funnel according to the preferred embodiment of the present invention is identified in the drawing by reference numeral 10. The loading funnel 10 is held by a funnel arm 12, which is attached to a sleeve 14. The sleeve 14 is attached to a vertically extending post 16, and the post 16 is periodically shiftable along its longitudinal central axis and oscillatible about its longitudinal central axis to periodically position the funnel 10 immediately above an open blank mold 18 of a glass forming machine of the I.S. type, that is a blank mold without a baffle in place to close an opening at the top thereof. An arrangement for moving a set of funnels into and out of alignment with the openings into a set of blank molds of an I.S. machine section is described in U.S. Pat. No. 4.120,693 Irwin), the disclosure of which is incorporated by reference herein. As is shown in FIG. 2, three spaced apart like funnels 10 are carried by the funnel arm 12 when it is desired to practice the present invention with an I.S. machine operating according to the triple gob process, that is, an I.S. machine that is operated to simultaneously form three containers at each of the machine sections. Of course, it is also contemplated that the present invention can be practiced with I.S. glass forming machines operating according to the double gob process, in which case the funnel arm 12 would carry two like funnels 10, or according to the "quad" process, in which case the funnel arm 12 would carry four like funnels.

Figure 1:
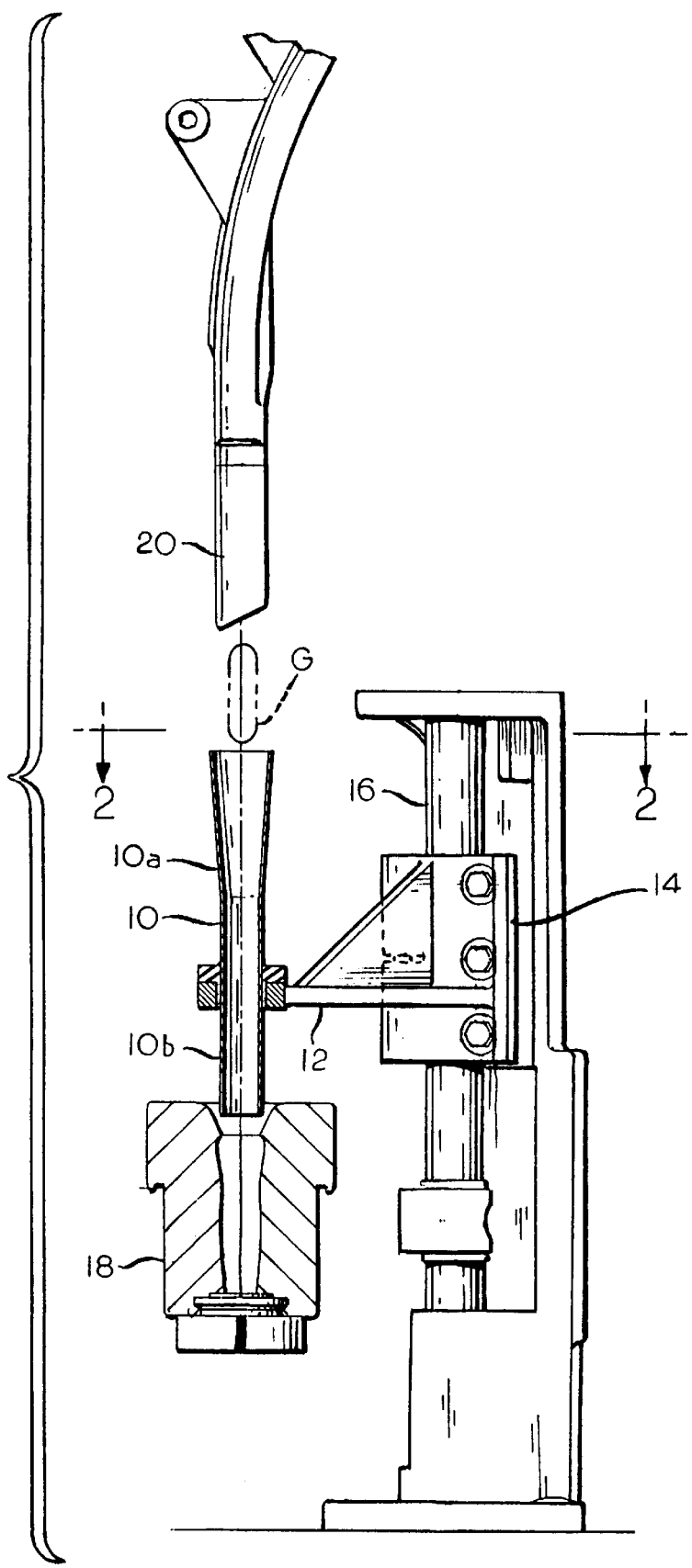

The funnel 10 sequentially receives gobs of molten glass from a glass gob delivery system, a deflector element 20 thereof being shown fragmentarily in FIG. 1. A gob of molten glass which is identified by reference G in FIG. 1, passes through the deflector 20 and then through the loading funnel 10 into a blank mold 18 of an I.S. glass forming machine.

The funnel 10 has an upper annular gathering section 10a whose outer shape is that of an inverted frustum of a cone, and an annular gob shaping and orienting section 10b, whose outer shape is that of a cylinder, specifically, a right circular cylinder when used with a blank mold to produce round-bodied containers. The gob G entering the funnel 10 on its way toward the blank mold 18 passes through the gathering section 10a of the loading funnel 10, during which time it begins a process of having its longitudinal central axis aligned with the longitudinal central axis of the blank mold 18. The gob G then passes through the shaping and orienting section 10b of the loading funnel 10, after which the gob G enters the blank mold 18.

The orienting and shaping section 10b of the loading funnel 10 has an axial length that is sufficiently long to precisely position the gob G with its longitudinal central axis precisely aligned with the longitudinal central axis of the blank mold 18. For example, it is preferred that the axial length of the orienting and shaping section 10b of the loading funnel 10 be slightly greater than the axial length of the longest glass gob to be passed therethrough and that the inside size of the orienting and shaping section 10b is slightly smaller than the outside size of the gob G intended to be passed therethrough, so that the gob G exiting from the loading funnel 10 will be precisely externally positioned, sized and shaped with respect to the internal size and shape of the cavity within the blank mold 18. In this way, there will be no frictional engagement between the gob G and the blank mold 18 as the gob G travels to the bottom of the blank mold 18, and this fact can be used to advantage to eliminate, or at least substantially reduce, the need to periodically swab the inside of the blank mold 18 with a mold dopant to overcome the effects of such frictional engagement.

Although, the best mode contemplated by the inventors for carrying out the present invention as of the filing date hereof has been shown and described herein, it will be apparent to those skilled in the art that suitable modifications, variations and equivalents can be made without departing from the scope of the invention, such scope being limited solely by the terms of the following claims and the legal equivalents thereof.

What is claimed is:

1. The method of introducing a gob of molten glass into a non-rotating blank mold of a glass container forming machine of the individual section type, the blank mold being incapable of rotating about a longitudinal axis of the blank mold and being incapable of rotating about a longitudinal axis of the forming machine, the method comprising:

passing the gob of molten glass through an annular loading funnel immediately before the gob is introduced into the blank mold, the loading funnel having an internal diameter that is sufficiently small to be able to contact the gob along the periphery of the gob and thereby impart a predetermined outer diameter to the gob, the loading funnel having a sufficient length to orient the gob with respect to the blank mold so that a longitudinal axis of the gob is substantially coaxial with a longitudinal axis of the blank mold.

2. The method according to claim 1 wherein no mold dopent is applied to the blank mold prior to forming a parison of a glass container from a gob of glass passing through the loading funnel or after the forming of a parison in the blank mold.

3. The method according to claim 1 wherein the internal diameter of the loading funnel is sufficiently small to limit the outer diameter of the gob passing therethrough to a value less than the inner diameter of an opening in the blank mold through which the gob enters the blank mold.

* * * * *